United States Patent [19]

Bartholomew

[11] Patent Number: 4,981,586
[45] Date of Patent: Jan. 1, 1991

[54] SWIVELABLE QUICK CONNECTOR ASSEMBLY

[75] Inventor: Donald D. Bartholomew, Marine City, Mich.

[73] Assignee: Proprietary Technology, Inc., Southfield, Mich.

[21] Appl. No.: 360,862

[22] Filed: Aug. 8, 1989

Related U.S. Application Data

[60] Division of Ser. No. 251,038, Sep. 26, 1988, which is a continuation of Ser. No. 127,537, Dec. 2, 1987, which is a continuation of Ser. No. 748,307, Jun. 24, 1985, which is a division of Ser. No. 360,201, Mar. 22, 1982, which is a continuation-in-part of Ser. No. 201,711, Oct. 29, 1980.

[51] Int. Cl.$^5$ .................. B01D 27/00; F16L 37/12
[52] U.S. Cl. ................................ 210/435; 285/319; 285/348; 285/94; 210/459
[58] Field of Search .............. 285/319, 346, 921, 308, 285/321, 340, 281, 924; 210/459, 435

[56] References Cited

U.S. PATENT DOCUMENTS

| | | |
|---|---|---|
| 730,378 | 6/1903 | Lambert . |
| 921,691 | 5/1909 | Friday . |
| 1,542,421 | 6/1925 | Strongson . |
| 1,837,345 | 12/1931 | Thomas . |
| 1,976,589 | 10/1934 | Trickey . |
| 2,123,889 | 7/1938 | Gleason . |
| 2,441,344 | 5/1948 | Bosworth . |
| 2,585,887 | 2/1952 | Woodward . |

(List continued on next page.)

FOREIGN PATENT DOCUMENTS

| | | |
|---|---|---|
| 163947 | 9/1949 | Austria . |
| 2360921 | 6/1974 | Fed. Rep. of Germany . |
| 2307154 | 8/1974 | Fed. Rep. of Germany . |
| 2611233 | 9/1977 | Fed. Rep. of Germany . |
| 2622269 | 11/1977 | Fed. Rep. of Germany . |
| 881439 | 7/1980 | U.S.S.R. . |
| 634848 | 3/1950 | United Kingdom . |
| 693094 | 6/1953 | United Kingdom . |
| 718350 | 11/1954 | United Kingdom . |
| 781554 | 8/1957 | United Kingdom . |
| 791247 | 2/1958 | United Kingdom . |
| 1030535 | 5/1966 | United Kingdom . |
| 1145667 | 3/1969 | United Kingdom . |
| 1172348 | 11/1969 | United Kingdom . |
| 1343665 | 1/1974 | United Kingdom . |
| 1350546 | 4/1974 | United Kingdom . |
| 2011002 | 7/1979 | United Kingdom . |
| 2014115 | 8/1979 | United Kingdom . |

OTHER PUBLICATIONS

See copending application Serial No. 07/251,038, filed Sep. 26, 1988.
See copending application Ser. No. 07/360,407, filed Jun. 2, 1989.
See copending application Ser. No. 07/360,405, filed Jun. 2, 1989.
See copending application Ser. No. 07/360,548, filed Jun. 2, 1989.
See copending application Ser. No. 07/360,387, filed Jun. 2, 1989.

*Primary Examiner*—Dave W. Arola
*Attorney, Agent, or Firm*—Harness, Dickey & Pierce

[57] ABSTRACT

A swivelable quick connect assembly for use with tubular conduits is disclosed as comprising a housing having an axial bore for receiving one end of the conduit, an elastomeric ring-like meal is disposed in the bore for providing a fluid tight seal between confronting portions of the conduit and the housing, an annular bushing is disposed in the bore for positioning the seal and for guiding the one end of the conduit into nesting relationship with the bore, and a retainer is detachably secured to the housing and is cooperable with an annular projection on the conduit for securing the conduit in its operative position within the bore, the retainer having resilient deformable portions which are adapted to snap over the locking wall upon insertion of the conduit into the housing bore.

6 Claims, 1 Drawing Sheet

U.S. PATENT DOCUMENTS

| | | |
|---|---|---|
| 3,314,696 | 4/1967 | Ferguson et al. |
| 3,450,424 | 6/1969 | Calisher |
| 3,453,005 | 7/1969 | Foults |
| 3,527,485 | 9/1970 | Goward et al. |
| 3,534,988 | 10/1970 | Lindsey |
| 3,538,940 | 11/1970 | Graham |
| 3,569,903 | 3/1971 | Brishka |
| 3,574,359 | 4/1971 | Klein |
| 3,584,902 | 6/1971 | Vyse |
| 3,628,768 | 12/1971 | Huft |
| 3,711,125 | 1/1973 | Dehar |
| 3,718,350 | 2/1973 | Klein |
| 3,724,882 | 4/1973 | Dehar |
| 3,780,773 | 12/1973 | Haugen |
| 3,826,523 | 7/1974 | Eschbaugh |
| 3,929,356 | 12/1975 | DeVincent et al. |
| 3,929,357 | 12/1975 | DeVincent et al. |
| 3,933,378 | 1/1976 | Sandford et al. |
| 3,980,324 | 9/1976 | Bouteille et al. |
| 4,005,883 | 2/1977 | Guest |
| 4,009,896 | 3/1977 | Brewer |
| 4,080,752 | 3/1978 | Burge |
| 4,111,464 | 9/1978 | Asano et al. |
| 4,123,089 | 10/1978 | Viero et al. |
| 4,123,091 | 10/1978 | Cosentino et al. |
| 4,128,264 | 12/1978 | Oldford |
| 4,135,745 | 1/1979 | Dehar |
| 4,136,885 | 1/1979 | Uhrner |
| 4,158,407 | 6/1979 | Rest |
| 4,214,586 | 7/1980 | Mericle |
| 4,219,222 | 8/1980 | Brusadin |
| 4,244,608 | 1/1981 | Stuemky |
| 4,266,814 | 5/1981 | Gallagher |
| 4,423,892 | 1/1984 | Bartholomew |
| 4,483,371 | 11/1984 | Susin |
| 4,483,543 | 11/1984 | Fisher, Jr. et al. |
| 4,524,995 | 6/1985 | Bartholomew |
| 4,601,497 | 7/1986 | Bartholomew |
| 4,681,351 | 7/1987 | Bartholomew | ically apparent with respect to providing a connection

SWIVELABLE QUICK CONNECTOR ASSEMBLY

CROSS REFERENCE TO A RELATED APPLICATION

This is a division of U.S. patent application Ser. No. 251,038, filed Sept. 26, 1988 entitled "A SWIVELABLE QUICK CONNECTOR ASSEMBLY" which is a continuation application of Ser. No. 127,532, filed Dec. 2, 1987, which is a continuation application of Ser. No. 748,307, filed June 24, 1985, which is a divisional application of Ser. No. 360,201, filed Mar. 22, 1982, which is a continuation-in-part application of Ser. No. 201,711, filed Oct. 29, 1980, all having the same title as above.

BACKGROUND AND SUMMARY OF THE INVENTION

The present invention relates to a connector assembly for providing a swivelable quick connection.

In the automotive industry, as well as for many other industries, the need always exists for low-cost, reliable, and easy to assemble components. This need is especially apparent with respect to providing a connection between fluid carrying conduits, such as a fuel or refrigerant lines. In older threaded connectors, substantial assembly time could be accumulated in screwing on a cap to a fitting and tightening the cap down to the proper torque needed to provide for a fluid tight seal. Further, an inventory would have to be maintained to keep track of the number of caps and fittings, and any liners or other components that may be necessary. Also, retightening of the caps may be required to maintain the seal after the automobile or other system has been put in use.

Accordingly, it is the primary object of the present invention to provide an improved connector assembly for providing a swivelable quick connection between fluid conveying conduits.

In addition, it is an object of the present invention to provide a pre-assembled connector housing and retainer element so that a connection to a tubular fluid conveying conduit may be made in one step without resorting to any tools.

Another object of the present invention is to provide a pre-assembled connector housing and retainer element so that a snapping connection may be made to a tubular fluid conveying conduit.

Another object of the present invention is to provide a connector assembly that may be employed to join dissimilar electrically conducting materials that would be otherwise subject to galvanic corrosion.

It is a further object of the present invention to provide a connector assembly which is adapted to provide for a bleed-down position when disconnecting a conduit from the housing of the connector assembly.

It is another object of the present invention to provide a pre-assembled connector conduit unit which requires only a one-step snapping connection to be joined to a connecter housing.

It is yet another object of the present invention to provide a removable, disposable cover for protecting the pre-assembled connector conduit unit.

It is a further object of the present invention to provide a disposable stuffer-plug for the connector assembly which is adapted to install one or more sealing elments in an axial bore of the connector housing and detachably secure a retainer element to the connector housing, as well as to seal the axial bore of the connector housing.

It is still a further object of the present invention to provide a connector assembly which employs a check valve unit disposed in the axial bore of the housing for selectively blocking fluid flow.

It is also an object of the present invention to provide an improved retainer element which operates to both secure the conduit in the axial bore of the housing and position the sealing element within the axial bore of the housing.

It is a more specific object of the present invention to provide an improved retainer element formed with three or more leg members which operate to detachably secure the retainer element to the housing, the sealing means within the housing, the conduit in its operative position within the axial bore of the housing, and provide better resistance to off axis forces on the conduit.

To achieve the foregoing objects, the present invention provides a swivelable connector assembly which generally comprises a tubular conduit, a housing, sealing means, and retainer means. The tubular conduit is adapted to convey fluid and is formed with an annular projection disposed a predetermined distance from the end of the conduit to be connected. The housing is formed with an axial bore for receiving the conduit at a first end and for providing a fluid path at a second end, and includes an inwardly extending annular lip (or suitable apertures) at the first end to detachably secure the retainer means to the housing. The sealing means is disposed within the axial bore of the housing for providing a fluid tight seal between confronting portions of the conduit and the housing. The retainer means is adapted to be disposed generally within the axial bore of the housing for cooperating with the annular projection of the conduit to secure the conduit in its operative position within the axial bore of the housing. The retainer means includes three or more circumferentially spaced resilient deformable leg members which extend from an integral collar member at one end thereof. Each of the leg members has an outwardly opening channel portion which is adapted to receive the inwardly extending lip of the housing to secure the retainer means to the housing, and an inwardly opening channel portion adapted to receive the annular projection of the conduit for securing the conduit in its operative position within the axial bore of the housing. The ring from which the legs extend may additionally serve to position and retain the sealing means.

Additional objects and advantages of the present invention will become apparent from reading of the detailed description of the preferred embodients which makes reference to the following set of drwings in which:

DETAILED DESCRIPTION OF THE PREFERRED EMBODIMENTS

Figure 1:
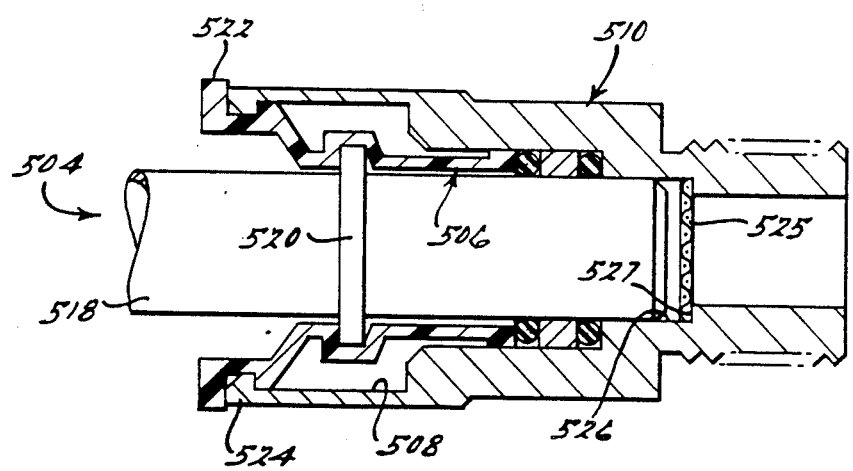
FIG. 1 is a side elevation view, partially in cross-section of another connector assembly according to the present invention.
Figure 2:
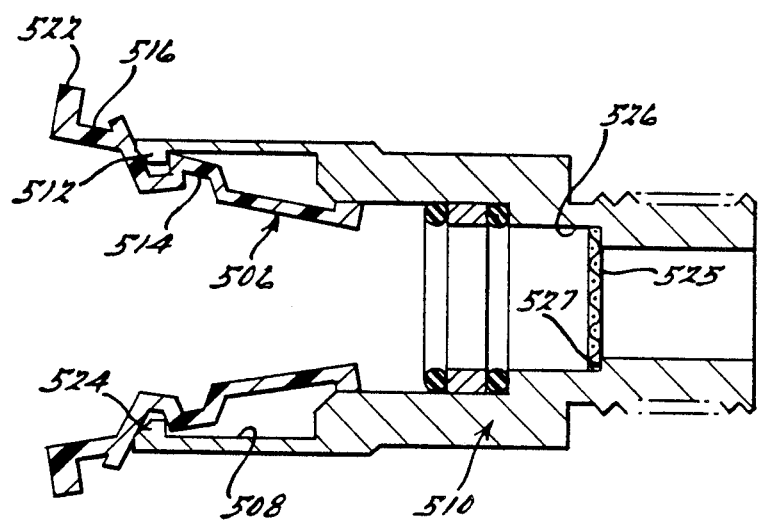
FIG. 2 is a cross-sectional side elevation view of the connector assembly illustrated in FIG. 1, particularly showing the retainer element in a partially installed position.

Referring to FIG. 1, a side elevation view of another connector assembly 504 is shown, partially in cross-section. The connector assembly 504 features a retainer element 506 which is similar to the retainer element 316 of FIGS. 17 and 18. In FIG. 1, the retainer element 506 is shown in its operative position generally within the axial bore 508 of the connector housing 510. However, retainer element 506 is also adapted to be disposed in a partially installed position, as illustrated in FIG. 2. In the partially installed position, the retainer element 506 will engage the annular lip 512 of the housing between the inwardly opening channel portion 514 and the outwardly opening channel portion 516 of the retainer element. Accordingly, it should be appreciated that this engagement will operate to maintain the retainer element 506 in this position until the conduit 518 is to be inserted into the axial bore 508 of the housing 510. It should be noted that as the conduit is inserted into the axial bore 508 of the housing 510, the annular projection 520 passes freely into the inwardly opening channel portion 514, and the operator should be able to visually observe that the annular projection 520 of the conduit has been received into the inwardly opening channel portions 514 of the retainer element leg members. Upon the further insertion of the conduit 518 into the axial bore 508 of the housing 510, the retainer element 506 will be carried with the conduit until the annular lip 512 of the housing snaps into the outwardly opening channel portions of the retainer element leg members. Although each of the leg members of the retainer element 506 is provided with a finger portion 522 extending out of the axial bore 508, this feature of the retainer element may be deleted such that once the conduit 518 is in its operative position within the axial bore the retainer element will be flush with the first end 524 of the housing and the retainer element will not be visible from the side of the connector assembly. Accordingly, this modification of the retainer element 506 will provide the operator with a visible indication that the conduit is in its operative position and the assembly is complete.

The connector assembly 504 is also provided with a filter or screen 525 which serves to filter particulate matter from the fluid flowing through the bore of the connector assembly. The filter 525 is disposed in a reduced diameter portion 526 of the bore 508, and is adapted to be interposed between the end of the conduit 518 to be connected and a shoulder 527 of the housing 510. The filter 525 may be made from any suitable material, such as metal wire or plastic mesh. It should be understood that the provision of the filter 525 is not limited to the connector assembly 504, and the filter may be employed in other suitable connector housings.

While the above description constitutes the preferred embodiments of the present invention, it will be appreciated that the invention is susceptible to modification, variation and change without departing from the proper scope and fair meaning of the accompanying claims.

I claim:

1. A connector assembly for use in communicating a fluid media, said assembly comprising:
 a conduit;
 a housing;
 a retainer element;
 a sealing element;
 said conduit being generally tubular shaped and including a first axially-extending portion having a relatively smooth cylindrical exterior surface and disposed adjacent a terminal end of said conduit, a second axially-extending portion of enlarged diameter disposed axially outwardly from said first axially-extending portion and adapted for engagement with said retainer element, a third axially-extending portion disposed axially outwardly from said second axially-extending portion and having an outer diameter smaller than the outer diameter of said second portion;
 said sealing element being of an annular configuration and disposed in axial registry with said first axially-extending portion of said conduit and having an inner diameter sealingly engaged with the exterior surface thereof and adapted to be disposed within said housing;
 said housing having an axial bore adapted for receiving at least a portion of said conduit, said bore including a first portion communicable with a fluid passage and adapted to receive the terminal end of said conduit, a second portion adapted for sealing engagement with the outer diameter of said sealing element, and a third portion adapted to operatively receive said retainer element, said third portion having means defining at least one radially extending surface cooperable with said retainer element for securing the same within said bore and preventing disassembly of said conduit from said housing;
 means for retaining said sealing element within said second portion of said bore;
 said retainer element including at least one relatively deformable portion extending substantially parallel to the axis of said conduit, at least one relatively non-axially deformable portion extending between the axially outerside of said second axially-extending portion of said conduit and said radially-extending surface of said housing and thereby maintaining said retainer element within said bore and preventing withdrawl of said conduit from said housing, and said relatively deformable portion of said retainer element being sufficiently long and deformable to allow sufficient radial movement of said relatively non-axially deformable portion to permit said non-axially deformable portion to be radially outwardly by said second axially-extending portion of said conduit as said conduit is inserted into said bore, and to cause said relatively non-axially deformable portion to snap radially inwardly adjacent the axially outer side of said second axially-extending portion when said conduit is positioned in place within said bore; and
 filter means disposed within said housing for filtering particulate matter from the fluid flowing through said bore in said housing.

2. The assembly as set forth in claim 1, wherein said filter means comprises a screen disposed in said first portion of said bore.

3. The assembly as set forth in claim 2, wherein said screen is interposed between the end of said conduit and a shoulder of said housing.

4. The assembly as set forth in claim 3, wherein said screen is made from metal wire mesh.

5. The assembly as set forth in claim 3, wherein said screen is made from plastic mesh.

6. A connector assembly for use in communicating a fluid media, said assembly comprising:

a conduit;
a housing;
a retainer element;
a sealing element;
said conduit being generally tubular shaped and including a first axially-extending portion having a relatively smooth cylindrical exterior surface and disposed adjacent a terminal end of said conduit, a second axially-extending portion of enlarged diameter disposed axially outwardly from said first axially-extending portion and adapted for engagement with said retainer element, a third axially-extending portion disposed axially outwardly from said second axially-extending portion and having an outer diameter smaller than the outer diameter of said second axially-extending portion;
said sealing element being of an annular configuration and disposed in axial registry with said first axially-extending portion of said conduit and having an inner diameter sealingly engaged with the exterior surface thereof and adapted to be disposed within said housing;
said housing having an axial bore adapted for receiving at least a portion of said conduit, said bore including a first portion communicable with a fluid passage and adapted to receive the terminal end of said conduit, a second portion adapted for sealing engagement with the outer diameter of said sealing element, and a third portion adapted to operatively receive said retainer element, said third portion having means defining at least one radially extending surface cooperable with said retainer element for securing the same within said bore and preventing disassembly of said conduit from said housing;
means for retaining said sealing element within said second portion of said bore;
said retainer element including at least one relatively deformable portion extending substantially parallel to the axis of said conduit, at least one relatively non-axially deformable portion extending between the axially outerside of said second axially-extending portion of said conduit and said radially-extending surface of said housing and thereby maintaining said retainer element within said bore and preventing withdrawl of said conduit from said housing, and said relatively deformable portion of said retainer element being sufficiently long and deformable to allow sufficient radial movement of said relatively non-axially deformable portion to permit said non-axially deformable portion to be biased radially outwardly by said second axially-extending portion of said conduit as said conduit is inserted into said bore, and to cause said relatively non-axially deformable portion to snap radially inwardly adjacent the axially outer side of said second axially-extending portion when said conduit is positioned in place within said bore;
filter means disposed within said housing for filtering particulate matter from the fluid flowing through said bore in said housing;
said filter means comprises a screen disposed in said first portion of said bore and is made from a mesh material.

* * * * *

UNITED STATES PATENT AND TRADEMARK OFFICE
CERTIFICATE OF CORRECTION

PATENT NO. : 4,981,586

DATED : Jan. 1, 1991

INVENTOR(S) : Donald D. Bartholomew

It is certified that error appears in the above-identified patent and that said Letters Patent is hereby corrected as shown below:

On the title page, under "Related U.S. Application Data", "Ser. No. 127,537" should be --Ser. No. 127,532--;

Abstract, Line 4, "meal" should be --seal--;

Col. 1, Line 25, after "as", delete --a--;

Col. 1, Line 66-67, "elments" should be --elements--;

Col. 2, Line 55, after "from", insert --a--;

Col. 2, Line 56, "embodients" should be --embodiments--;

Col. 2, Line 57, "drwings" should be --drawings--;

Col. 3, Lines 7-8, after "506", delete -- which is similar to the retainer element 316 of FIGS. 17 and 18--;

Col. 4, Line 41, Claim 1, "withdrawl" should be --withdrawal--;

Col. 4, Line 46, Claim 1, after "be", insert --biased--;

Col. 6, Line 13, Claim 6, "withdrawl" should be --withdrawal--.

Signed and Sealed this

Eighth Day of December, 1992

Attest:

DOUGLAS B. COMER

Attesting Officer

Acting Commissioner of Patents and Trademarks